United States Patent [19]

Osada et al.

[11] 4,203,103

[45] May 13, 1980

[54] BATTERY DETERIORATION INDICATOR FOR AN ELECTRONIC DESK TOP CALCULATOR

[75] Inventors: Kazuhiko Osada, Yokohama; Yoshishige Ogawa, Kawasaki; Ichizo Takimoto, Yokohama, all of Japan

[73] Assignee: Tokyo Shibaura Electric Co., Ltd., Japan

[21] Appl. No.: 891,741

[22] Filed: Mar. 30, 1978

[30] Foreign Application Priority Data

Mar. 30, 1977 [JP] Japan .................................. 52-35704

[51] Int. Cl.² .............................................. G06F 3/14
[52] U.S. Cl. .................................. 340/753; 340/636; 340/691; 340/715; 340/756
[58] Field of Search ............... 340/636, 691, 336, 756, 340/715, 753, 717

[56] References Cited

U.S. PATENT DOCUMENTS

| | | | |
|---|---|---|---|
| 3,898,790 | 8/1975 | Takamune et al. | 340/691 |
| 4,010,456 | 3/1977 | Erni | 340/636 |
| 4,020,414 | 4/1977 | Paredes | 340/636 |
| 4,024,415 | 5/1977 | Matsuura | 340/636 |
| 4,037,399 | 7/1977 | Chihara | 340/636 |
| 4,052,717 | 10/1977 | Arnold et al. | 340/636 |
| 4,074,515 | 2/1978 | Asano | 340/636 |

*Primary Examiner*—Marshall M. Curtis
*Attorney, Agent, or Firm*—Finnegan, Henderson, Farabow, Garrett & Dunner

[57] ABSTRACT

A battery deterioration indicator has a plurality of indication regions indicating a battery life when a battery voltage falls to a voltage corresponding to a predetermined different voltage level. The indicator is capable of detecting the drop of the battery voltage which shows the battery deterioration and indicating in turn the deteriorating degrees of the battery in the order of from a smaller degree of deterioration to a larger. Accordingly, users may know the battery deterioration by seeing signs indicated on the indicator long enough before the battery life runs out to secure a replacement and at the same time may know how long the remaining battery life will last.

8 Claims, 11 Drawing Figures

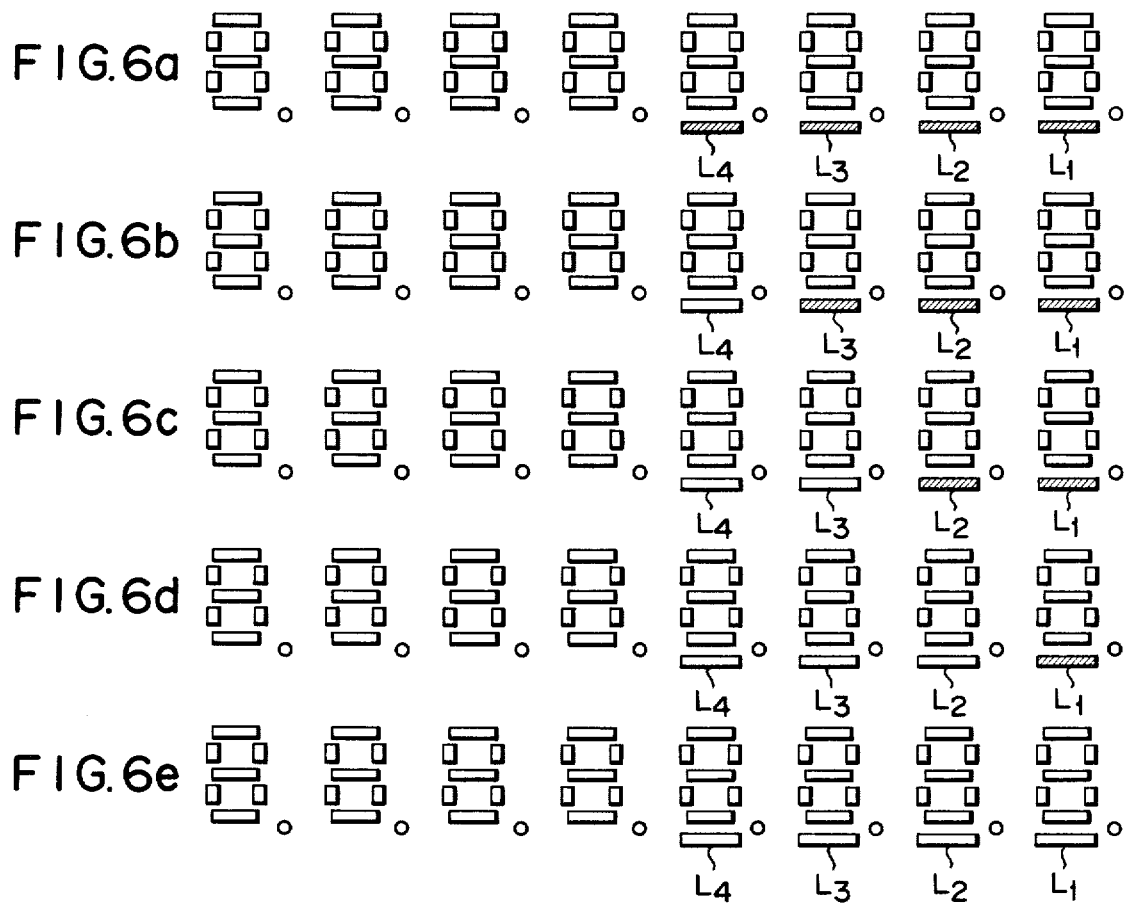

BATTERY DETERIORATION INDICATOR FOR AN ELECTRONIC DESK TOP CALCULATOR

BACKGROUND OF THE INVENTION

This invention relates to a battery deterioration indicator which is used, for example, with an electronic desk top calculator with a battery as power source and indicates a battery deterioration, i.e. the remaining a battery life by detecting the battery voltage.

In recent years, a battery operated type electronic device, particularly, a device provided with integrated circuit (IC) has been designed to be operable with low power consumption. Some electronic desk top calculators with large scale integrated circuits (LSI) appearing on the market are durable for use extending from hundreds to thousands hours without replacement of batteries. In addition, some electronic watches with LSI's of the complementary symmetry metal oxide semiconductor (C-MOS) type appearing at present can even be used for years without replacing batteries. It is often experienced that such an electronic device, as mentioned above, is suddenly put in an unusable state by complete deterioration of the battery voltage, that is, consumption of the battery life during the use of it. For example, in case of an electronic desk top calculator of the long life type, for which C-MOS type LSI and a liquid crystal display device are used, the interval of time in which the battery need not be changed is long. Therefore, experiences teach us that spare batteries are seldom provided in advance. In other words, if the abovementioned battery life is exhausted during the use of the calculator, the calculating operation is compelled to be interrupted until a new battery is secured for replacement of the old one, and that is an extremely inconvenient condition.

As a solution of this problem, the following type battery life indicator has heretofore been employed. The calculator is provided with a voltage comparator capable of comparing the actual battery voltage with a predetermined limited voltage corresponding to the voltage expected to be detected just before the battery life runs out. When the battery voltage drops as low as a voltage level corresponding to the predetermined voltage, the voltage comparator operates so as to make a part of a display section of the calculator indicate a sign which indicates that the battery life will be completely consumed before long. Such a means for indication may be, for example, a means in which the individual decimal points of the display units constituting the display section are all activated, or a means in which an exclusive display region for the battery life indication is provided in the display region.

With the conventional battery life indicator as mentioned above, however, the indications are not effected till the time just before the battery life is used up. Accordingly, with the conventional indicator, it is impossible to judge how long the battery in the calculator may be used in future. Thus, the time for the battery to be changed for a new one cannot be forecast with the result that the battery life often is consumed while the calculator is being used. In such a case, using the calculator must be discontinued for a while if any spare battery is not provided for emergency. From the view point of practicality, the conventional battery life indicator is not a useful instrument.

SUMMARY OF THE INVENTION

An object of this invention is to provide a battery deterioration indicator for use in a battery-operated type electronic desk calculator, capable of predicting the time for changing the battery by indicating the drop in battery voltage far enough in advance to permit securing a replacement before exhaustion of the battery.

For accomplishing the above object, the battery deterioration indicator of the invention comprises: means for detection of the battery voltage level to provide indication signals when each of predetermined reference voltage levels and the battery voltage coincide with each other by making comparison of the battery voltage level with each of the predetermined reference voltage levels which are related to the deterioration of the battery and are set to at least two of the fixed levels one of which is preset to a limiting battery voltage level for a normal operation of the calculator, and the other, or the remaining of which, are preset to levels for predicting in advance the limiting battery voltage level just before exhaustion; and a means for displaying the indication signals provided by the means for detection of the battery voltage level.

With such a construction as above described, one will find not only the time for the battery to be changed but also in time for securing a replacement before the battery life runs out. Accordingly, the calculator provided with the battery deterioration indicator according to this invention may surely be saved from such inconvenience that the calculator is unusable until battery for replacement is secured due to consumption of the battery life during the use of the calculator.

BRIEF DESCRIPTION OF THE DRAWINGS

FIGS. 6a to 6e in order show the conditions of a battery deteriorating indication of eight digits section as shown in FIG. 2; and FIG. 7 shows one form of a circular indicator element including five segments for a battery deteriorating indication.

DETAILED DESCRIPTION OF THE PREFERRED EMBODIMENTS

Figure 1:
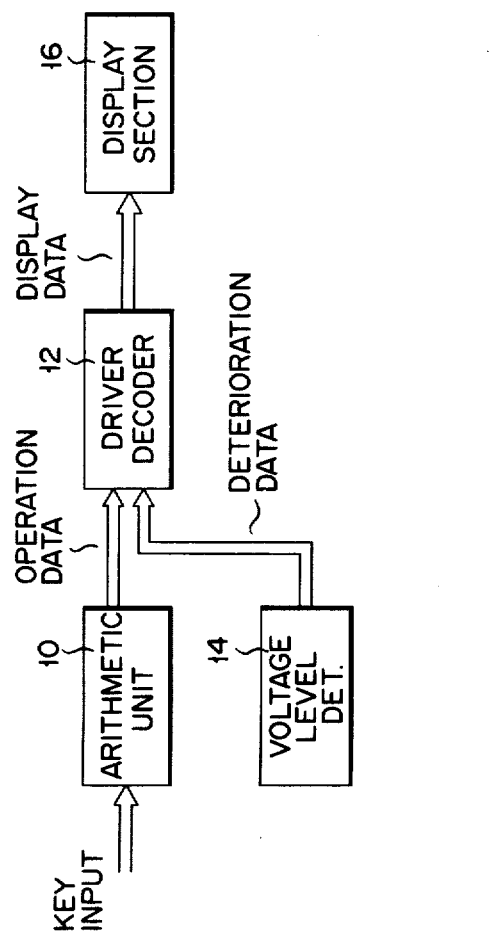
FIG. 1 shows one form of display units of a display section having a segment for battery deteriorating indication.

Referring now to FIG. 1 to FIG. 7, there will briefly be described an outline of the invention prior to the description of a preferred embodiment in accordance with the invention. Through the drawings, the same reference numerals and signs are used to designate common portions of the battery deterioration indicator to simplify the description.

In the case where the means for voltage level detection consists of two voltage level detectors, the battery deterioration indicator is formed in such a manner as follows. One level is preset to a second voltage level corresponding to the predetermined limiting battery voltage level for the extent of the normal operation of the calculator, and the other level is preset to a first voltage level corresponding to the predetermined battery voltage level for a given time in advance of battery exhaustion. When the battery deterioration progresses so far as the step where the battery voltage level coincide with the first voltage level, one of the battery voltage level detectors indicates a sign showing that preparation should be made for changing the battery. When the battery deterioration further progresses to the point where the battery voltage level coincide with the second voltage level, the other voltage level detector displays a sign showing that the battery must be changed.

Additionally, in case where the means for voltage level detection comprises three or more voltage level detectors, the indicator will be formed as follows. Two detectors of the means for detection are used in the same manner as mentioned above, one for advance indication of battery change and one for indicating the battery in use must be changed. A fourth detector, of the means for detection indicates the progressing battery deterioration within the period between the advance indication and the time for actually changing the battery.

In the case where, for example, four detectors are used, assume that the remaining operating time of the battery in use is divided into 10-hour intervals. The first indication of the indicator shows that the battery life may be used up in 30 hours of additional use of the calculator. The second indication will then show that the battery in use may be used for only 20 more hours ahead. Further, the third indication will show that the battery should be replaced after use for another 10 hours. The battery for replacement may be provided at this time. Finally, the fourth indication will show that the battery should be changed immediately.

Although at least two individual indicating regions may be used for the means for display of the battery deterioration indicator as above-mentioned, and yet, the means for indication may take a form as described below. Namely, a single indicating region may be started to be turned on and off continuously at a time when the battery deterioration progresses so far as the point when the changing battery must be provided. Turning on and off of the indicating region is accelerated with the progress of the battery deterioration, and at a time when the turning on and off of the indicating region ceases and the indication region is left turned on continuously, the indicating region shows that the battery must be replaced.

Conversely, the indicating region may be made to start being quickly turned on and off at a time of the advance warning that the time for changing the battery is approaching and may be slowed down in the quickness of the turning on and off with the progress of the battery deterioration, and then may be allowed to stop turning on and off at a time when the battery must be changed. To realize such an indication of the battery deterioration, an indication signal whose oscillating frequency is varied in accordance with the battery voltage level may be given by the use of a voltage controlled oscillator (V.C.O.). In this case, a single indicating region serves the purpose well.

FIG. 1 shows an embodiment of one of the display units constituting the display section of a battery operated type of electronic desk top calculator. Each of the display units has three electrode lines driven in turn with duty of ⅓, i.e. back plate lines ($P_1$, $P_2$, $P_3$), and the other three electrode lines, i.e. segment lines ($a_i$, $b_i$, $c_i$). In cases where a liquid crystal display panel is used as the display section of a desk top calculator, display units formed of 3 by 3 electrode lines are often employed. Each of the display units has eight segments in total of which seven segments (A to G) are used for displaying figures and one segment is used for decimal point (H). Since, however, the display unit forms a matrix of three columns and three rows, nine segments maximum may be contained. That is, in addition to the eight segments as above mentioned, another segment L for the battery deteriorating indication can be provided on the display unit. Therefore, an extra indicator device is not necessary for indicating the battery deterioration.

Figure 2:
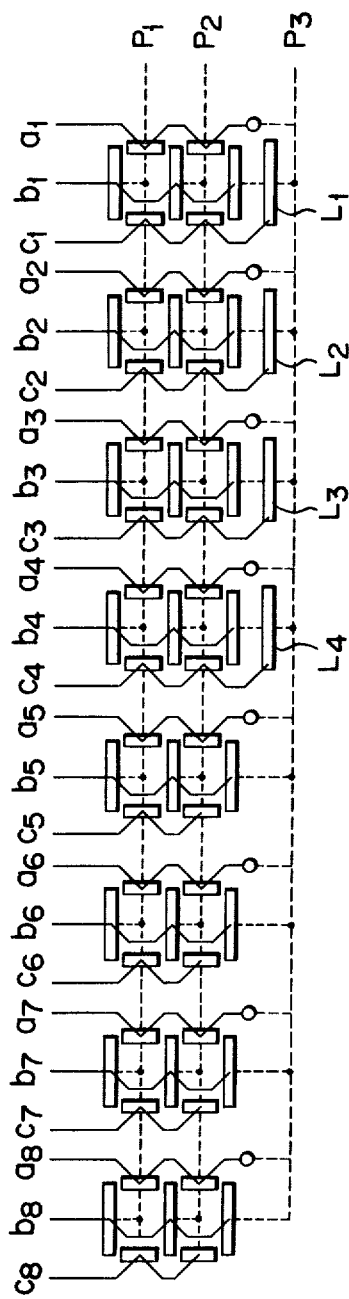
FIG. 2 shows one form of an eight-digit display section including four segments for battery deteriorating indication.

FIG. 2 shows a display section in which 8 units of the above display units are used, i.e. 8 digits decimal display panel. On the display panel, the three back plate lines are used in common for each of the units and each of the segment lines of the units is connected to a driver circuit to drive the display panel, respectively, together with the back plate lines. As is apparent from the above description, the display panel shown in FIG. 2 is a display section constructed for dynamic drive use. In the display panel of FIG. 2, there is shown the case where four of the units each having a segment L, are used for the battery deteriorating indication.

Figure 3:
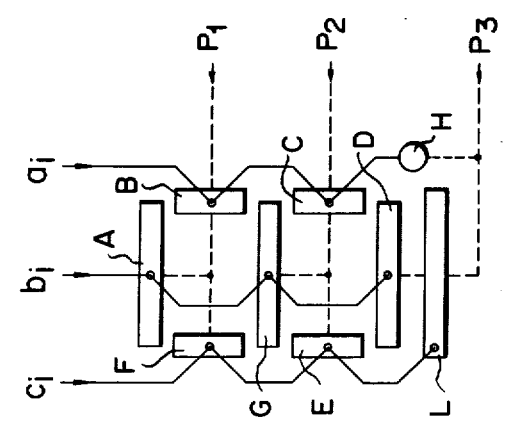
FIG. 3 shows a basic block diagram of an electronic desk top calculator including a battery deterioration indicator according to the present invention.

FIG. 3 shows a block diagram of a desk top calculator capable of indicating the battery deterioration using the display panel or the display section. Signals based on key input are subjected to operation processing by arithmetic unit 10 and operation data as operation results are inputted to driver/decoder 12. The driver/decoder 12 is provided also with the deterioration data as an input signal obtained from a voltage level detector 14 used for the voltage level detecting means. The detector 14 serves to feed signals which indicate the deterioration data, i.e. the deteriorating degrees of the battery to the driver/decoder 12, by comparing the voltage level of the battery as the power source of the calculator with predetermined voltage levels. The operation data and the deterioration data are converted by the driver/decoder 12 into the display data for driving the display section and the display data is fed to the display section 16. The display section 16, therefore, can not only display the operation results based on the above-described key input but also indicate the battery deterioration. Thus, FIG. 3 shows a well-known basic construction of a desk top calculator, but provided with the effective battery deterioration indicator according to this invention.

Figure 4:
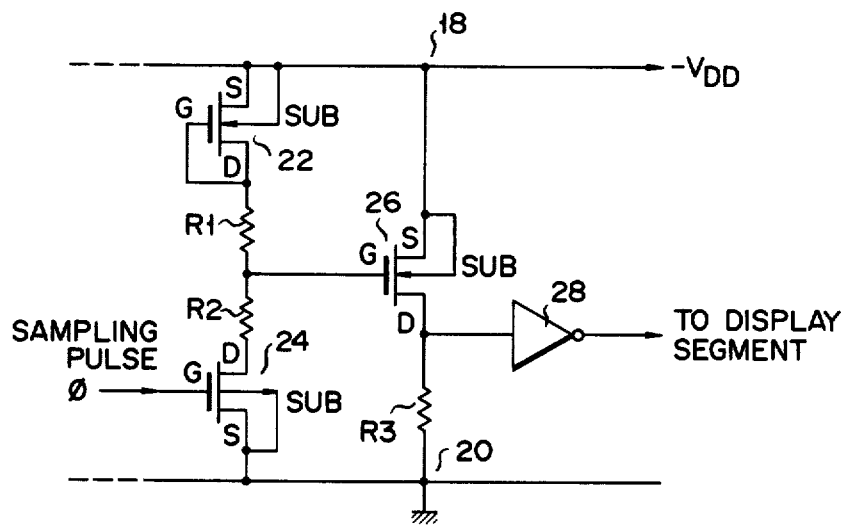
FIG. 4 shows one preferred embodiment of a voltage detection circuit for detecting a predetermined voltage level used for a battery deterioration indicator according to the invention.

FIG. 4 concretely shows an example of a circuit construction necessary for making up the voltage level detector 14 as shown in FIG. 3. A voltage divider comprising a series circuit of an enhancement type N-channel MOS-FET 22, resistors $R_1$, $R_2$, and an enhancement type P-channel MOS-FET 24, is connected between power source line 18, provided with the battery voltage level $-V_{DD}$ and ground line 20 whose voltage level is zero. The source and substrate of FET 22 as a lead element are connected to the line 18, and the drain and gate of FET 22 are connected to one end of resistor $R_1$. The other end of resistor $R_1$ is connected to one end of resistor $R_2$ and the other end of resistor $R_2$ is connected to the drain of FET 24. The source and substrate of FET 24 for a sampling drive are connected to the line 20, and the gate of FET 24 is fed with sampling pulse φ. Further, a series circuit of an enhancement type N-channel MOS-FET 26 and resistor $R_3$ is connected between the line 18 and the line 20. The source and substrate of FET 26 are connected to the line 18, and the drain of FET 26 is connected to the line 20 via resistor $R_3$. The gate FET 26 is connected to the connection point of the resistors $R_1$ and $R_2$ and furthermore, the drain of FET 26 is connected also to an input terminal of an inverter 28. The inverter 28 inverts the phase of the signal taken out of the drain of FET 26 into a signal for driving the segment L and provides it to the display section 16.

As described above, the circuit construction shown in FIG. 4 forms one voltage level detector. That is, in case where the display section having four segments $L_1$ to $L_4$ is used as shown in FIG. 2, four circuits (four groups of circuits) of the voltage level detectors are employed.

The individual voltage level detector, that is, the circuit shown in FIG. 4, operates as follows. When the power source switch of the calculator is turned on, the sampling pulse φ is fed to the gate of FET 24. FET 24 is maintained in a conductive state while the pulse φ is being fed, whereby a potential difference with a certain magnitude is applied between the source and the gate of FET 26. The potential difference will be large enough to turn on FET 26 when the battery voltage level $-V_{DD}$ is more than the aforementioned predetermined voltage level peculiar to the voltage level detector. Namely, the voltage level at the drain of FET 26 attains a level close to the battery voltage level $-V_{DD}$ so that an output produced from the inverter 28 attains a level close to the voltage level of the line 18, or the ground level. Assume now that a threshold voltage between source and gate is taken as $V_{TH26}$ when FET 26 is turned on, and the equivalent internal resistances of FET's 22 and 24 in conductive operation are taken as resistors $r_{22}$ and $r_{24}$, respectively. Both FET 22 and FET 24 are in the state of OFF when the sampling pulse φ is not fed to the gate of FET 24, and turned on when the sampling pulse φ is fed thereto.

In this condition, potential difference $-V_{P1}$ appearing between the source-gate of FET 26 will be given by formula (1) as follows.

$$-V_{P1} = \frac{(r_{22} + R_1)}{(r_{22} + R_1) + (R_2 + r_{24})} (-V_{DD}) \quad (1)$$

FET 26 is in the state of ON when the voltage $-V_{P1}$ is levelled under the voltage $V_{TH26}$, and in the state of OFF when the voltage $-V_{P1}$ is over the voltage $V_{TH26}$. Since the voltage $V_{TH26}$ and resistors $R_1$, $R_2$, $r_{22}$ and $r_{24}$ are the voltages and resistances peculiar to the voltage detector circuit, the voltage detector as a result has the aforesaid predetermined voltage level peculiar thereto. Assume again that, for example, a nominal voltage of the battery $-V_{DD}$ is placed at $-6$ volts, the threshold voltage $V_{TH26}$ at 2 volts, and the resistances of the resistors $R_1$, $R_2$, $r_{22}$ and $r_{24}$ are defined such that $R_1 = R_2$ and $r_{22} = r_{24}$. Then the voltage $V_{P1}$ comes to be 3 volts in formula (1) when the voltage $-V_{DD}$ is placed at $-6$ volts. From the above description, the voltage of $V_{P1}$ is higher than that of $V_{TH26}$ (3 volts more than 2 volts) so that FET 26 is turned on and the level of output signal of the inverter 28 will be nearly equal to the ground level. Also, when the voltage $-V_{DD}$ is placed at $-4$ volts, the voltage $V_{P1}$ is 2 volts in formula (1). In such a case, the voltage $V_{P1}$ equals to the voltage $V_{TH26}$ so that if the voltage $-V_{DD}$ is larger even slightly than the voltage of $-4$ volts, the voltage $V_{P1}$ becomes smaller than the voltage $V_{TH26}$ to turn off FET 26, and makes the level of output signal of the inverter 28 nearly equal to the voltage level $-V_{DD}$. Under the condition as abovementioned, the predetermined voltage level of this voltage detector is concluded as $-4$ volts. The predetermined voltage level may be changed optionally for the setting thereof, as apparent from formula (1). Setting of the resistances of the resistors $R_1$ and $R_2$ to proper values is allowable, for example.

Figure 5:
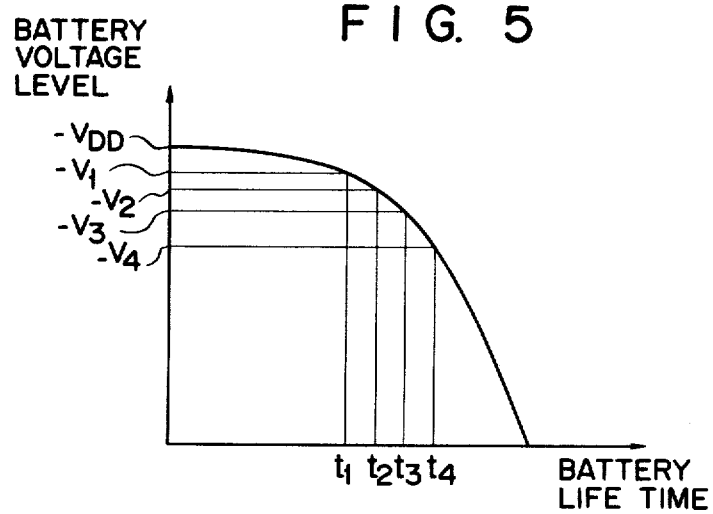
FIG. 5 illustrates a graph of the relationship between a deterioration of a battery voltage level and a battery life time.

FIG. 5 illustrates a graph of the relationship between the predetermined voltage levels and the battery lifetime in case where voltage detectors having the four different predetermined voltages $-V_1$, $-V_2$, $-V_3$ and $-V_4$, respectively, are used as shown in FIG. 4. FIG. 6a to FIG. 6e show diagrams of what changes in the indication of the battery deterioration are made, correspondingly to FIG. 5. If the battery operating time remaining is more than $t_1$, none of the four battery voltage detectors is actuated and all segments $L_1$ to $L_4$ are ON as shown in FIG. 6a. When the remaining battery operating time reaches $t_1$, the first voltage detector detects the battery voltage level having come to $-V_1$ and thereby the segment $L_4$ is turned off as shown in FIG. 6b. Thereafter, when the remaining battery operating time reaches $t_2$, the second voltage detector detects the battery voltage level having come to $-V_2$, and the segment $L_3$ is also turned off, as shown in FIG. 6c. Then, when the battery operating time is diminished to $t_3$, the third voltage detector detects the battery voltage level having come to $-V_3$ the segment $L_2$ is also turned off as shown in FIG. 6d. And finally, when the battery operating time reaches $t_4$, the fourth voltage detector detects the battery voltage level having come to $-V_4$, and also the segment $L_1$ is turned off, as shown in FIG. 6e. That is, the indication of FIG. 6a gives an advance warning of the battery condition, and FIG. 6b shows that a time of the changing battery has started to approach. FIG. 6c and FIG. 6d show in turn the remaining life of the battery in use and accordingly, FIG. 6e shows that the battery in use must be changed at once.

In the case of a display system wherein the segments L of the display units are dynamically driven together with the other eight segments, the segments L are indicated only when the operation result of the calculator is displayed. Accordingly, if the indication of the battery deteriorating is wanted to be as shown at all times, segments L must be turned on through a power line different from that used by the other eight segments.

The indication of the battery deterioration is, as previously explained utilizing FIG. 6a to FIG. 6e, given by successively turning the segments off with the progress of the battery deterioration. Another method of the indication may be chosen as follows. Instead of having all the segments L turned on in the condition as shown in FIG. 6a, all of the segments $L_1$ to $L_4$ may be turned off and with the progress of the deterioration, the segments are turned on in turn. Then all the segments are adapted to be turned on in the condition as shown in FIG. 6e. Or again, only one of the segments is turned on at any time and the segment turned on may be shifted from $L_4$ to $L_1$ in the order of $L_4 \rightarrow L_3 \rightarrow L_2 \rightarrow L_1$.

The aforementioned segments L are not limited to take a form of the bar as shown in FIG. 1, but may take a free shape, for example, such as a circular graph 30 as shown in FIG. 7, within the range of size of staying in the display section. The number of the segments L is not necessary to be 4 pieces, as shown in FIG. 2. The number of the segments L may optionally be increased more than 2 pieces, if the battery voltage detectors are provided by the number corresponding to the number of the segments L. When an eight digits display section is used as shown in FIG. 2, the segments L up to 8 maximum may be provided. Further, the battery deterioration indicator of the invention may be utilized not only for a desk top calculator but also for an electronic watch and related instruments.

Setting the foregoing predetermined voltage level may be realized by other methods as well. Assume that, for example, an equivalent internal resistance of FET 26 in conductive operation is placed at a resistor $r_{26}$ and the inverter 28 has the threshold voltage $V_{TH28}$ peculiar to inverting operation. In this condition, the aforesaid voltage $-V_{P1}$ is preset to be small enough in order that FET 26 is ready to be turned on at any time with a voltage within a voltage range of the battery by which the voltage detector is to be operated. Assume now again that potential drop effected to a resistor $R_3$ is taken as $-V_{P2}$, when FET 26 is turned on with the sample pulse $\phi$, $-V_{P2}$ will be given by equation (2) as follows.

$$-V_{P1} = \frac{R_3}{r_{26} + R_3}(-V_{DD}) \quad (2)$$

It will be understood from the above equation that in this case as well as previously described using equation (1), the voltage detector has the peculiar predetermined voltage level and the predetermined voltage level may optionally be preset. The predetermined voltage level in this case is, as clear from the equation (2), changeable in accordance with the modification of the resistor $r_{26}$ or $R_3$. Generally, modifying the resistor $r_{26}$ is so troublesome that the predetermined voltage level is preferably decided according to the modification of the resistor $R_3$.

Although a specific circuit and construction of the battery deterioration indicator has been illustrated and described herein, it is not intended that the invention be limited to the elements and circuit arrangement disclosed. One skilled in the art will recognize that the particular elements or subcircuits may be changed without departing from the spirit of the invention.

What we claim is:

1. A battery deterioration indicator for an electronic desk calculator having display units including three column lines and three row lines for enabling a nine-segment display unit, seven of the segments being used to display a character and an eighth segment being used to display a decimal point, the indicator comprising:
   means for detecting the progressive deterioration of the voltage level of the battery, including
   first means for providing a limiting battery reference voltage level at exhaustion of battery voltage for normal operation of the calculator,
   at least one second means for providing at least one predetermined reference voltage representative of at least one stage of deterioration of the voltage level of the battery in advance of the limiting battery voltage level, and
   means for comparing the actual voltage level of the battery with said reference voltages and for providing individual signals indicative of the attained reference voltage levels; and
   means responsive to said comparing means for displaying the progressive deterioration of the voltage level of the battery including the remaining segment of each of a predetermined number of said display units for respectively indicating the receipt of an individual one of said signals, said remaining segments being arranged in the order of magnitude of said reference voltage levels.

2. A battery deterioration indicator according to claim 1, wherein each of said remaining segments is bar-shaped and located in the vicinity of the seven segments.

3. A battery deterioration indicator according to claim 1, wherein said display regions are disposed in a circle.

4. A battery deterioration indicator according to claim 1, wherein said means for detecting the progressive deterioration of the battery voltage level includes, for each reference voltage, a voltage divider for dividing the battery voltage level with a fixed dividing ratio; and a detection transistor having a peculiar threshold voltage for conductive operation, and for comparing the peculiar threshold voltage with a divided voltage supplied from the voltage divider to provide an individual signal.

5. A battery deterioration indicator according to claim 4, wherein said voltage divider has a series circuit comprising:
   a first transistor as a load element having a first electrode, connected to a line having the battery voltage level;
   a first resistor having one terminal connected to second and third electrodes of said first transistor; said first, second and third electrodes being the source drain and gate, respectively, of the transistor;
   a second resistor having one terminal connected to the other terminal of said first resistor as an output terminal of said voltage divider; and
   a complementary second transistor of said first transistor for a sampling drive based on a dynamic drive, having a drain connected to the other terminal of said second resistor, a source connected to ground and a gate connected for receiving a sampling pulse for the sampling drive.

6. A battery deterioration indicator according to claim 1, wherein said means for detecting the progressive deterioration of the battery voltage level includes for each reference level, a detection transistor, having a source drain and gate, and having a peculiar conductive resistance the source being connected to a line provided with the battery voltage level; a preset resistor for connecting a line having a ground level to the drain of said detection transistor so as to fix a dividing ratio for deciding the predetermined reference level which is fixed from a ratio of the peculiar conductive resistance to the resistance of said preset resistor in conductive operation of said detection transistor; and a switching circuit having a peculiar threshold voltage for a switching operation, by which a battery voltage level divided from said detecting transistor in conductive operation and said preset resistor is compared with the peculiar threshold voltage of said switching circuit so as to provide the individual signals.

7. A battery deterioration indicator according to claim 1, wherein said means for displaying the progressive deterioration of the battery voltage level includes a means for voltage-controlled oscillation which provides an on-off signal for the displaying means and whose intervals of time in the on-off signal alternation are switched over by said individual signals from said detecting means.

8. A battery deterioration indicator according to claim 7, wherein said means for voltage-controlled oscillation comprises a starting circuit which provides a starting signal when the battery voltage level coincides with an under voltage level less than the other predetermined levels; and a voltage-controlled oscillator which is oscillated upon receipt of the starting signal and of which the frequency of oscillation is controlled by the deteriorating battery voltage level.

* * * * *